United States Patent Office 3,226,247
Patented Dec. 28, 1965

3,226,247
RED SHADE BRIGHTENER AND CELLULOSE BRIGHTENING METHOD
Warren Schumann Forster, Basking Ridge, N.J., assignor to American Cyanamid Company, Stamford, Conn., a corporation of Maine
No Drawing. Filed June 26, 1963, Ser. No. 290,632
2 Claims. (Cl. 117—33.5)

This invention relates to a substituted benzidinesulfone sulfonic acid useful as a brightener or optical bleaching agent. This compound is represented by the formula:

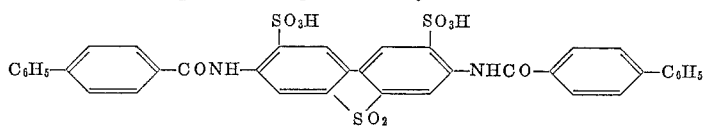

(I)

Salts of the compound of Formula I with one or two moles of a base having a dissociation constant ($K_b$) of $10^{-11}$ or greater (e.g., NaOH, KOH, NH$_4$OH, dicyclohexylamine, diphenylguanidine, etc.) are also contemplated.

Various types of compounds are used as brighteners or optical bleaching agents for textiles and paper. To be used as an optical bleaching agent, a compound must be substantive to the material to which it is applied (preferably, to a variety of fibers, both natural and synthetic), and stable and compatible with the soap and the detergent products with which it is blended and with which it is in contact. It should be stable to the action of chlorine bleaching agents during application, and after; and for special purposes (such as blending with solid bleaching agents), it should be stable when in contact with such agents in the solid form even for prolonged periods. Also, the compound should have to a high degree a desirable shade of blue fluorescence when applied to the fiber. On repeated application, the build-up effect should be a desirable one in that the fluorescent effect is increased, but without producing any undesirable shade of visible color on the fiber. A deficiency in any one or more of these properties may cause commercial rejection of the compound. Even when a compound satisfies the requirements as to substantivity, stability, chlorine fastness and strength of whitening effect applied to different fibers, it is necessary that the blue fluorescent effect have the desired shade of color. The blue fluorescence of brighteners varies from a definite greenish-blue shade of fluorescent light to a definite reddish-blue shade of fluorescent light.

Under certain conditions, to achieve a desirable and attractive result, a brightener showing a red shade of blue fluorescence may be required. For such requirements, green shade brighteners are unsatisfactory.

One known class of brighteners is derived from benzidinesulfone disulfonic acid and the members of this class are called benzidinesulfone brighteners. Several members of this class have found commercial acceptance; however, although satisfactory for certain purposes, they do not always meet the requirements as to shade of fluorescence, particularly where a red shade of fluorescence is desired.

The present invention is based on the discovery that the benzidinesulfone derivative represented by the formula above is a useful brightener which shows unexpectedly a redder shade of fluorescence and, at the same time, retains the other desirable characteristics of certain brighteners of this class which make them of commercial interest.

This new brightener shows a much more desirable red shade of fluorescence than other commercially acceptable brighteners of this family, while retaining other qualities such as bleach stability and strength of fluorescence. This is surprising since other very closely related compounds are seriously deficient in these respects, an example being the corresponding ortho-position isomer.

Thus, the new brightener has a much redder shade of fluorescence than the commercially available brightener of the structure:

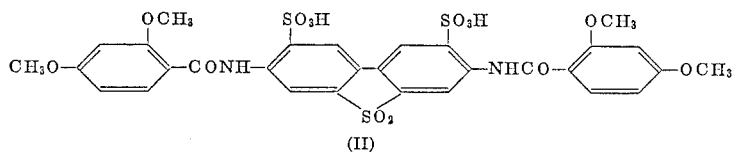

(II)

It is most surprising that the compound of Formula I is not deficient in strength of fluorescence, since the corresponding ortho-phenyl isomer (III), shows only a fraction of the strength of fluorescence.

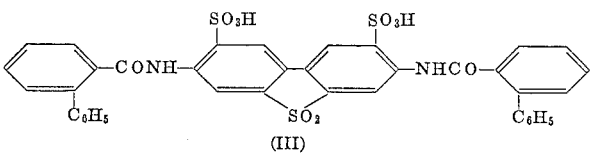

(III)

Thus, the brightener of this invention has a desirable red shade, and, in addition, it is of the order of six or more times as strong in fluorescene as the corresponding ortho isomer.

The brightener of this invention has desirable characteristics in addition to being superior in desirable red shade of fluorescence and strength of fluorescence. Thus, it may be applied with good results to cotton and to synthetic fibers such as nylon and acrylic fibers. Compared with the brightener of Formula II, the brightener of this invention shows 50% greater strength on nylon. It has superior build-up properties and excellent chlorine resistance. Its chlorine resistance is of such an order that it may be blended with a dry bleach composition such as calcium hypochlorite without deleterious effects on the brightener.

It may be applied to fabrics by conventional processes well-known in the art.

The brightener of this invention may easily be prepared by reaction of the acid chloride of 4-biphenylcarboxylic acid with the benzidinesulfone disulfonic acid pyridine salt in the presence of phosphorous oxychloride and pyridine.

This invention is further illustrated by the examples which follow:

EXAMPLE 1

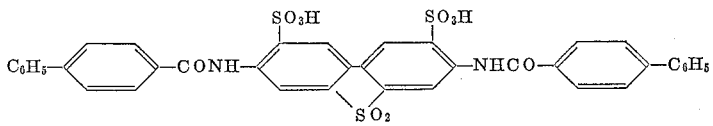

To a mixture of 23.2 grams of benzidinesulfone disulfonic acid pyridine salt, 23.7 grams of 4-biphenylcarboxylic acid and 110 grams of pyridine, is added dropwise, 11 grams of phosphorous oxychloride. The mixture is heated at the reflux temperature with stirring until a test shows the absence of any compound having a free amine group (approximately two hours). After cooling, the solid product which precipitates, is removed by filtration. It is recrystallized from the monomethyl ether of ethylene glycol.

EXAMPLE 2

*Sodium salt of the product of Example 1*

A mixture of 7.66 g. of the compound prepared as described in Example 1, 2000 ml. of water and 10 ml. of 5 N sodium hydroxide is heated to boiling with stirring and allowed to cool slowly. The product is filtered, washed with 10% brine and then dried at 55° C.

EXAMPLE 3

A stock solution of the product of Example 1 is prepared by dissolving 0.5 g. of the compound in one liter of 50% aqueous ethoxyethanol, giving a 0.05% solution. 100 ml. of this solution is diluted to one liter with water. The resulting stock solution contains 0.005% of the compound and is used in the following procedure.

A 6 ml. portion of the stock solution in a one pint Launder-Ometer jar is diluted to 100 ml. with 44 ml. of water and 50 ml. of a 1% anionic detergent solution, giving a solution which contains 0.06% brightener based on the weight of detergent. A 5 g. piece of cotton is introduced and the Launder-Ometer is run for 25 minutes at 130° F. The cotton is removed, rinsed in water at 80° F. and dried at room temperature. This sample is used as standard.

A number of similar brightener applications are made on cotton using varying amounts of the stock solution. The cotton samples are then compared under ultraviolet light and north daylight with the standard to determine which of the applications of the test compound gives equal fluorescence in ultraviolet light and equivalent brightening effect in north daylight. From the amount of the test brightener required to obtain equivalent strength of fluorescence compared with the standard, the relative strength of the test brightener versus the standard is determined.

In the table below is shown the strength of the brightener of this invention (the compound of Example 1) versus the corresponding o-position isomer (III) as determined by the foregoing procedure.

TABLE I

| Exhaust on Cotton from 0.5% Anionic Detergent Solution—1 Application | Brightener of This Invention (p-Phenylbenzoyl Derivative) | o-Phynl Isomer (III) |
|---|---|---|
| Under Ultraviolet Light | 100% (Standard) | 16%. |
| Under North Daylight | 100% (Standard) | 16%. |

I claim:

1: A compound selected from the group consisting of an acid of the formula:

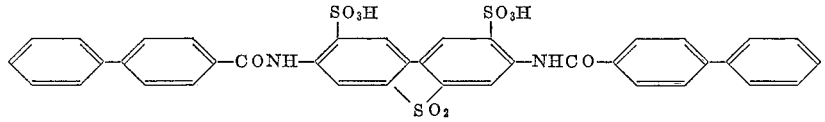

and a salt thereof with bases having a $K_b$ of at least $10^{-11}$.

2. The method of imparting a whiter appearance to cellulose, which comprises treating cellulose with an aqueous solution of a compound of claim 1.

References Cited by the Examiner
UNITED STATES PATENTS

| | | | |
|---|---|---|---|
| 2,563,493 | 8/1951 | Scalera et al. | 260—329.3 |
| 2,702,759 | 2/1955 | Scalera et al. | 260—329.3 |

WALTER A. MODANCE, *Primary Examiner.*
NICHOLAS S. RIZZO, *Examiner.*